United States Patent
Maples et al.

(10) Patent No.: US 9,715,038 B2
(45) Date of Patent: Jul. 25, 2017

(54) MARINE CABLE SUPPORT SYSTEM AND METHOD

(71) Applicant: SERCEL, INC., Houston, TX (US)

(72) Inventors: Michael Maples, Houston, TX (US);
Chuck Williams, Houston, TX (US);
Mark Turcotte, Katy, TX (US); Vu Khuc, Sugarland, TX (US)

(73) Assignee: SERCEL INC., Houston, TX (US)

( * ) Notice: Subject to any disclaimer, the term of this patent is extended or adjusted under 35 U.S.C. 154(b) by 625 days.

(21) Appl. No.: 14/041,327

(22) Filed: Sep. 30, 2013

(65) Prior Publication Data

US 2015/0089784 A1    Apr. 2, 2015

(51) Int. Cl.
| | | |
|---|---|---|
| *G01V 13/00* | (2006.01) | |
| *G01V 1/20* | (2006.01) | |
| *B23P 6/00* | (2006.01) | |
| *G01V 1/38* | (2006.01) | |

(52) U.S. Cl.
CPC .............. *G01V 13/00* (2013.01); *B23P 6/00* (2013.01); *G01V 1/201* (2013.01); *G01V 1/38* (2013.01); *G01V 2001/204* (2013.01); *G01V 2210/1423* (2013.01); *Y10T 29/49764* (2015.01); *Y10T 29/5187* (2015.01)

(58) Field of Classification Search
CPC . G01V 1/16; G01V 1/20; G01V 1/201; G01V 13/00; G01V 2210/1423; B23P 6/00; B21D 3/12; B21D 3/16; D07B 5/12; D07B 7/022; H01B 7/045; H01B 13/00; H01B 13/0036
See application file for complete search history.

(56) References Cited

U.S. PATENT DOCUMENTS

| | | | | |
|---|---|---|---|---|
| 1,555,739 | A * | 9/1925 | Wolfsberger | D07B 5/12 211/61 |
| 4,141,679 | A * | 2/1979 | Asano | B21D 3/12 264/DIG. 73 |
| 4,992,992 | A | 2/1991 | Dragoset, Jr. | |
| 5,175,989 | A * | 1/1993 | Messina | H02G 15/14 254/134.3 SC |
| 5,540,041 | A * | 7/1996 | Campbell | D07B 5/12 57/13 |
| 5,808,965 | A * | 9/1998 | Hull | G01V 13/00 367/13 |
| 2002/0097637 | A1* | 7/2002 | Pearce | G01V 1/201 367/154 |
| 2004/0081018 | A1* | 4/2004 | Sawin | G01V 1/201 367/20 |

FOREIGN PATENT DOCUMENTS

NO    WO 9953341 A1 *  10/1999    ............ G01V 1/201

* cited by examiner

*Primary Examiner* — Christopher M Koehler
(74) *Attorney, Agent, or Firm* — Patent Portfolio Builders PLLC (57) ABSTRACT

A torque relief system dissipates a torque in a marine cable section to be used for seismic data collection. The system includes a bench having a deadman unit; a tensioning element connected to the deadman unit; a swivel bearing unit connected to the tensioning element and configured to receive a first end of the marine cable section; and at least one bearing unit configured to support the marine cable section with reduced friction so that when the tensioning element tenses the marine cable section, the marine cable section and the first end rotate freely until the torque is dissipated.

20 Claims, 6 Drawing Sheets

MARINE CABLE SUPPORT SYSTEM AND METHOD

BACKGROUND

Technical Field

Embodiments of the subject matter disclosed herein generally relate to methods and systems and, more particularly, to mechanisms and techniques for releasing a torque in a seismic cable section prior to inserting various sensors inside the seismic cable.

Discussion of the Background

Marine seismic data acquisition and processing generate a profile (image) of the geophysical structure (subsurface) under the seafloor. While this profile does not provide an accurate location for oil and gas reservoirs, it suggests, to those trained in the field, the presence or absence of reservoirs. Thus, providing a high-resolution image of the subsurface is an ongoing process for the exploration of natural resources, including, among others, oil and/or gas.

Figure 1:
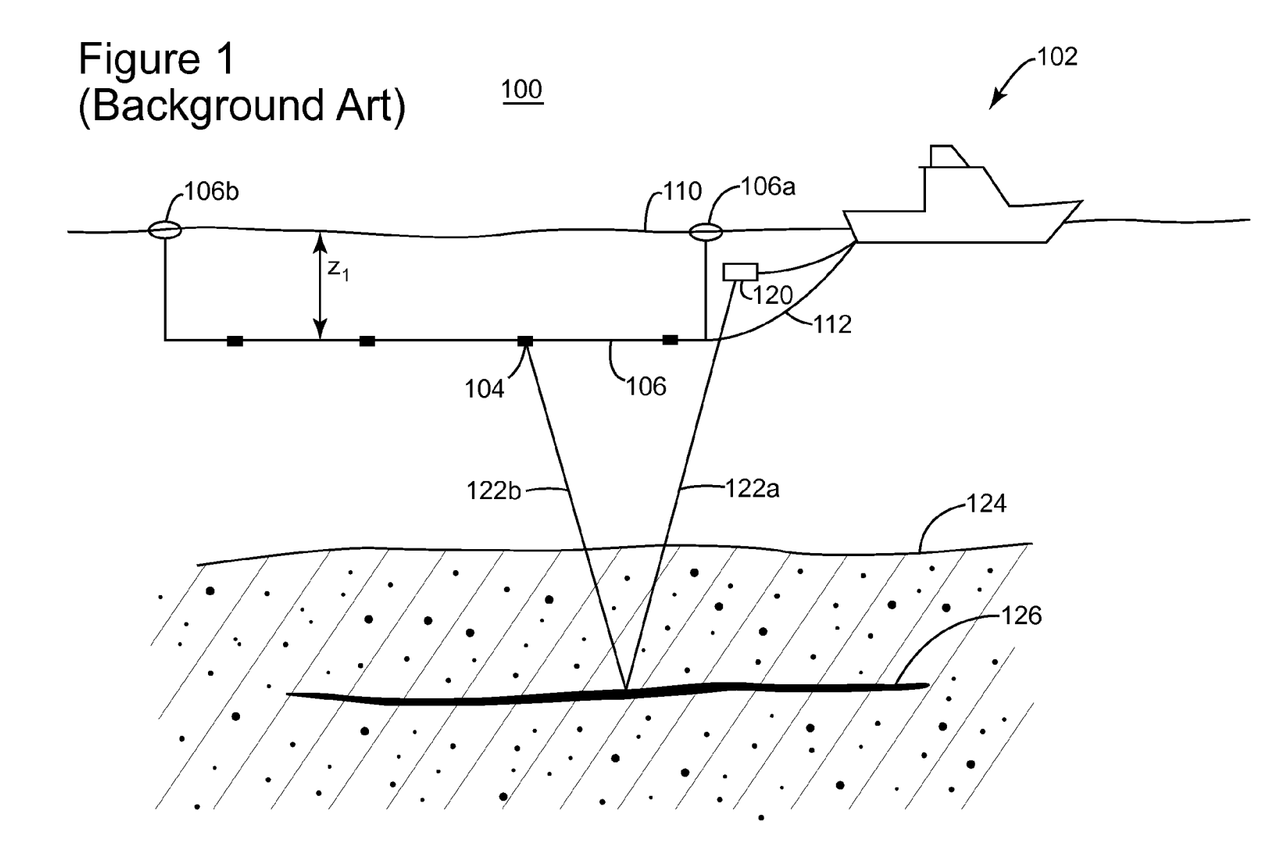
FIG. 1 is a schematic diagram of a conventional seismic data acquisition system having a horizontal seismic cable.

During a seismic gathering process, a seismic survey system 100, as shown in FIG. 1, includes a vessel 102 that tows plural seismic sensors 104 distributed along a seismic cable 106. Vessel 102 may tow plural seismic cables 106 at the same time. The seismic cables may be disposed horizontally, i.e., lying at a constant depth $z_1$ relative to the ocean's surface 110. Also, the plural seismic cables 106 may form a constant angle (i.e., the seismic cables may be slanted) with respect to the surface of the ocean as disclosed in U.S. Pat. No. 4,992,992, the entire content of which is incorporated herein by reference.

Still with reference to FIG. 1, each seismic cable may have a head float 106a and a tail float 106b connected to its respective ends for maintaining given depth $z_1$. A front-end gear 112 that includes various cables connects seismic cables 106 to vessel 102. Vessel 102 also tows a sound source 120 configured to generate an acoustic wave 122a, which propagates downward and penetrates the seafloor 124, eventually being reflected by a reflecting structure 126 (reflector). The reflected acoustic wave 122b propagates upward and is detected by seismic sensors 104. For simplicity, FIG. 1 shows only one path 122a corresponding to the acoustic wave.

The recorded traces may be used to determine an image of the subsurface (i.e., earth structure below surface 124). However, to produce a high-quality image of the subsurface, the seismic sensors used in the seismic cable need to perform as designed, i.e., to have actual characteristics that conform with the design characteristics envisioned by the design engineer. In addition, the seismic sensors are supposed to be aligned with one or more given directions within the seismic cable, and during the processing phase, this alignment is assumed to be obeyed by all seismic cables. If the alignment is not present, the recorded seismic data might be wrongly processed, generating inaccurate images of the surveyed surface.

More specifically, to eliminate much of the unwanted noise received by particle motion sensors in a seismic cable, it is desirable to form an array of sensors. The benefits of arrays are well-known in the art of acoustics, and the same benefits are achieved when particle motion sensors are combined to form an array. Sensor arrays provide a method to reduce unwanted noise by forming a spatial filter which can be tailored to receive the desired signal and attenuate unwanted noise.

To form an array or group of analog particle motion sensors, each sensor needs to be aligned relative to a given direction of the seismic cable so that individual sensors in the array receive signals from the same direction. This alignment normally takes place during the manufacturing phase, when the seismic cable has inherent torque. Note that inherent torque may be a consequence of manipulating, manufacturing, rolling, etc., of the cable during manufacturing or transport (e.g., from the manufacturing facility to the vessel designated to tow the seismic cable). When the seismic cable is towed through the water during normal data acquisition, there are no forces acting on it to counteract its inherent torque and, therefore, the seismic cable is free to rotate about its axis. When this cable rotation happens during data acquisition, it negatively impacts the recorded data because sections of the cable will have different orientations, resulting in sensors belonging to a same array having different orientations.

Figure 2A:
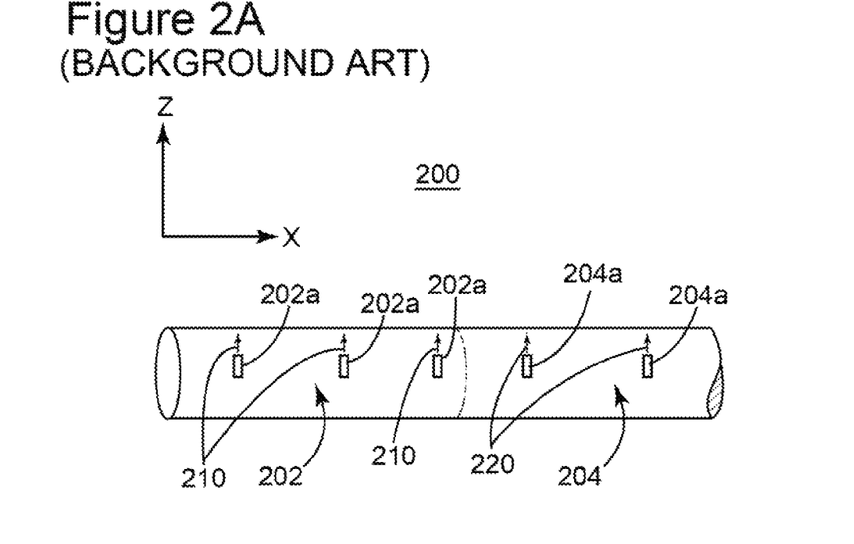
FIGS. 2A-C illustrate plural sensors having corresponding orientation axes and how these orientations change due to inherent torque of a seismic cable.
Figure 2B:
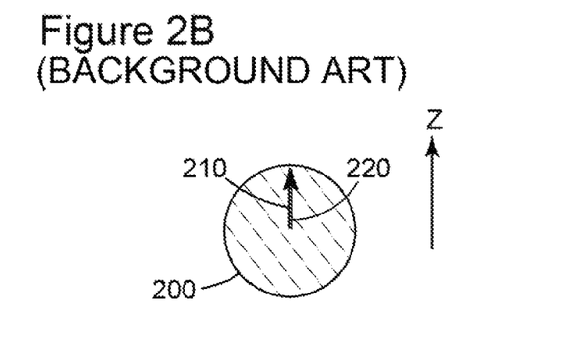
Figure 2C:
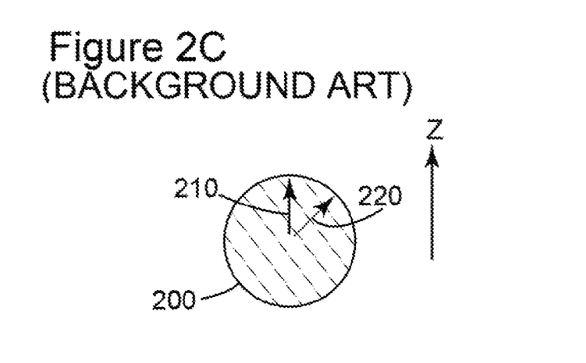

This problem faced by traditional manufacturing processes is illustrated in FIGS. 2A-C. FIG. 2A shows a seismic cable 200 considered to have, among many sections, sections 202 and 204. Sections 202 and 204 do not have to be physically different portions of the seismic cable. Sensors 202a in section 202 and sensors 204a in section 204 are aligned during the manufacturing process so that they all have their axes 210 and 220 parallel with, e.g., gravity, which is represented by axis Z in the figure. A cross-section view of seismic cable 200 is shown in FIG. 2B, illustrating that all the sensors' orientations coincide, i.e., arrows 210 and 220 are aligned with axis Z. This is during the manufacturing phase, when inherent torque is present in seismic cable 200. This is so because the seismic cable is supported during this phase by parts attached to a bench that cause considerable friction, which makes the release of inherent torque difficult, if not impossible. In other words, during manufacturing, frictional forces between the seismic cable and the bench do not allow torque to be relieved because the seismic cable is not free to rotate as it would in the water column, when towed by a vessel.

Thus, when the seismic cable is towed behind the vessel, frictional forces between the water and seismic cable are greatly reduced, and inherent torque has the opportunity to be relieved. During this process, section 204 may rotate relative to section 202 so that arrows 210 and 220 of corresponding sensors 202a and 204a are offset as illustrated in FIG. 2C, which is a cross-sectional view of seismic cable 200 during operation. Especially if sensors 202a and 202b are connected together to form an array, their different orientations in the same array introduce inaccuracies in the recorded data, which is undesirable.

Existing seismic cable technologies use either a single sensor for the group or MEMS devices to detect particle motion. The use of single sensors does not provide a method to attenuate inherent vibration in the seismic cable, which results in a highly noise-contaminated signal. MEMS devices can be used to form an array digitally, but digital signals from the MEMS devices must be individually processed. This requires additional data channels and, therefore, much higher data bandwidth and increased power consumption.

Thus, for those seismic cables using particle motion sensors combined in arrays, there is a need for a system and method that allows the seismic cable manufacturer to correctly align the sensors within the seismic cable during the manufacturing process while any inherent torque in the seismic cable is removed.

SUMMARY

According to an exemplary embodiment, there is a torque relief system for dissipating a torque in a marine cable section to be used for seismic data collection. The system includes a bench having a deadman unit; a tensioning element connected to the deadman unit; a swivel bearing unit connected to the tensioning element and configured to receive a first end of the marine cable section; and at least one bearing unit configured to support the marine cable section with reduced friction so that when the tensioning element tenses the marine cable section, the marine cable section and the first end rotate freely until the torque is dissipated.

According to another embodiment, there is a method for dissipating a torque in a marine cable section to be used for seismic data collection. The method includes placing the marine cable section along a bench; supporting the marine cable section with bearing units to reduce a torsional friction between the marine cable section and the bench; tensing the marine cable section to dissipate a torque formed inside the marine cable section while the torsional friction is reduced; and inserting sensors inside the marine cable section.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic cable and associated seismic sensors. However, the embodiments to be discussed next are not limited to seismic cables, but may be applied to other structures in which various components need to be kept aligned during a manufacturing phase and also during an operation phase.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Because seismic cables typically have very low torsional stiffness, a manufacturing technique is required to align the particle motion sensors during the manufacturing process. Thus, according to an embodiment, there is a system and method that provide an almost friction-free work bench to be used for assembling and testing sections that form a seismic cable. This method is also applicable to other type of sensors present inside the seismic cable, for example, a hydrophone, geophone, etc. In one application, the seismic includes both hydrophones and particle motion sensors. This manufacturing technique provides a method to measure and record the sensors' rotation angles once assembled into the seismic cable. Once the seismic cable is tensed without friction, it is free to rotate along its length and relieve internal torque as it would when towed behind a seismic vessel. Once torque is relieved and rotation has propagated out of the seismic cable, it can be clamped in place and the particle motion sensors can be installed with known alignment. After the sensors are installed and until the seismic cable is towed in water, additional torque may be produced in the seismic cable due to its manipulation, e.g., when rolled on a spool, which affects sensor alignment. However, when the seismic cable is free to rotate in water, the additional torque is dissipated and the sensors realign. In this way, when the seismic cable is towed by the vessel during a seismic survey, the particle motion sensors are expected to achieve the intended alignment.

Figure 3:
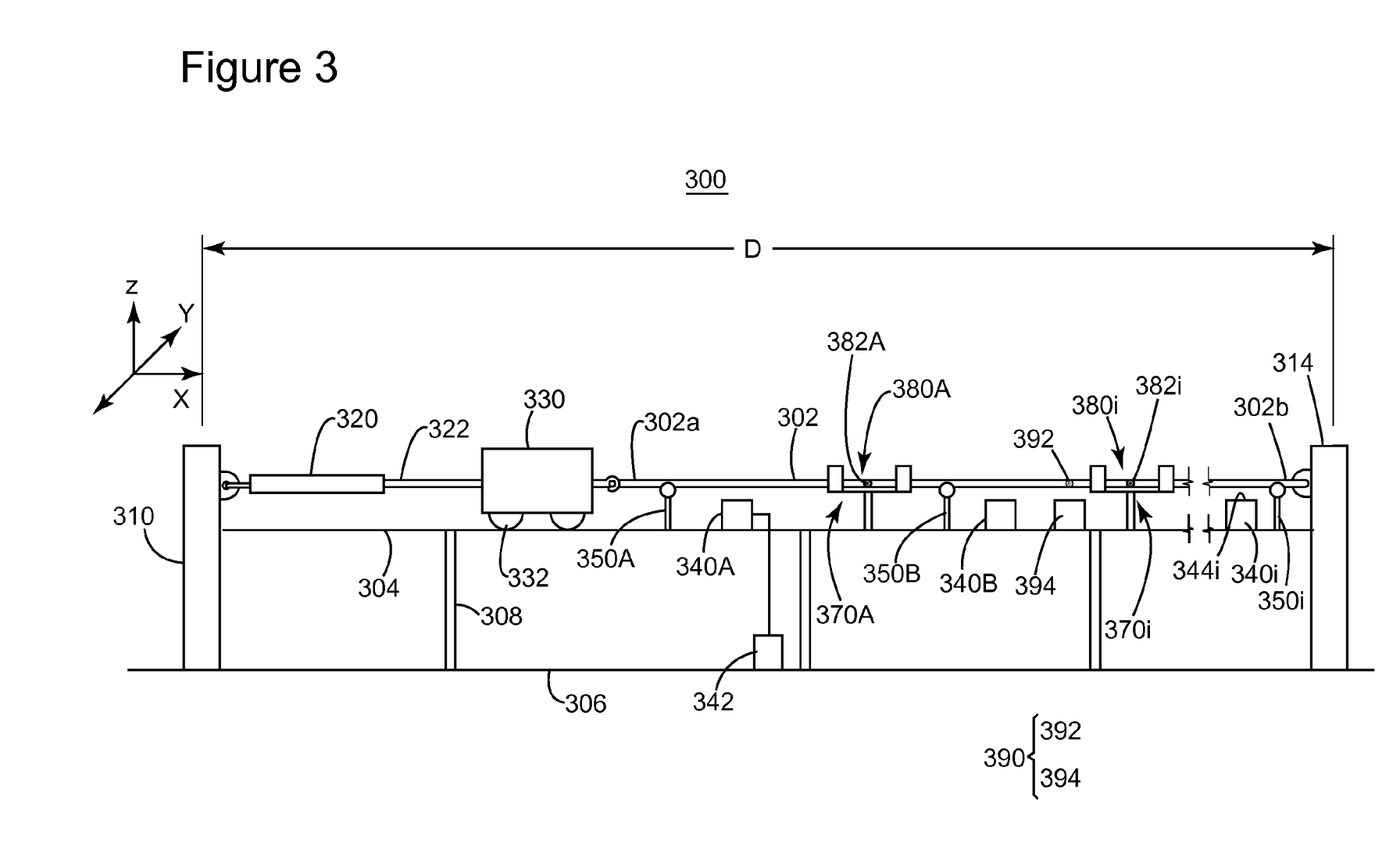
FIG. 3 is a schematic diagram of a section of a seismic cable supported by a stress-relieving system according to an embodiment.

According to an embodiment illustrated in FIG. 3, a torque relief system 300 may extend over a long distance D, for example, 150 m. A seismic cable may have a length of about 10 km and may include multiple sections 302, each having a length substantially equal to D. These sections connect to each other to form the seismic cable. System 300 provides support for the entire length of a section 302. Thus, one or more benches 304 extend across the floor 306 inside the production facility to support the entire seismic cable section 302.

A number of components of system 300 are now discussed. A deadman part 310 is fixedly attached either to the floor 306 or to bench 304. This deadman part needs to be strong and it needs to resist the effect of forces that appear when section 302 is tensed as discussed later. A tensioning element 320 is attached with one end to deadman part 310 and with another end to a swivel bearing unit 330. Tensioning element 320 may be activated to tense the seismic cable as discussed later. It may be an electric or pneumatic device or any other appropriate device known in the art. In one application, tensioning element 320 has a central member 322 that can extend away or toward the tensioning element's body so that tension is applied or removed from section 320.

Swivel bearing unit 330 is connected between an end 302a of section 302 and tensioning element 320 such that end 302a of section 302 can freely rotate when section 302 is under tension. In other words, swivel bearing unit 330 offers minimal rotational friction to end 302a of section 302 so that section 302 is almost free to rotate about longitudinal axis X. The other end 302b of section 302 may be connected to another deadman 314 or to another swivel bearing unit (not shown). Swivel bearing unit 330 may have wheels 332 for moving along the bench when the tensioning element 320 tenses section 302. Any known swivel bearing unit may be used as long as this unit promotes free rotation of section 302 and is designed to withstand the tension applied to this section.

One or more frictionless bearing units 340i are located at various positions along section 302, on bench 304, for providing frictionless support for the entire section 302.

Thus, in this way, not only one or both ends of section 302 but the entire section is permitted to freely rotate to relieve torsional stress. In one application, frictionless bearing unit 340$i$ is an air bearing, i.e., an active bearing unit in which air or another fluid is pumped from a pump 342 and provided between the air bearing and section 302 for preventing direct contact between section 302 and an upper surface 344$i$ of the air bearing. Thus, friction between section 302 and frictionless bearing unit 340$i$ is reduced to promote dissipation of torsional stress. Because the upper surface 344$i$ of frictionless bearing unit 340$i$ is sensitive, e.g., it can be easily damaged or deformed by contact with an object, e.g., the full weight of section 302, in one application a support element 350$i$ may be located next to a corresponding bearing unit 340$i$ so that when seismic cable 302 is not tensed, part of its weight is supported by support elements 350$i$ and not by frictionless bearing units 340$i$. However, support elements 350$i$ are optional. A simple support element may include a pole that has one end attached to the bench and the other configured to support a roller that contacts section 302. More sophisticated support elements may be used as will be appreciated by those skilled in the art.

One or more clamping units 370$i$ may also be mounted on bench 304 for clamping section 302 in place when inherent torque has been relieved. Clamping units 370$i$ are distributed along section 302 and in one application, they are located close (e.g., at predetermined distances) to positions 380$i$ where sensors 382$i$ need to be inserted into section 302. Clamping units 370$i$ may be activated mechanically, electrically or pneumatically for clamping section 302. In one application they are automatically activated. In another application, they are manually activated. Having clamping units next to positions where the sensors need to be inserted expedites the seismic cable manufacturing process because either the operator or robots may automatically insert the sensors while relying on the clamping sections as reference points. In other words, the clamping sections may be arranged in such a way that the operator or robot is instructed to insert a sensor at a given distance I from each clamping unit.

In one embodiment, most of system 300's elements discussed with reference to FIG. 3 may be attached to bench 304. Thus, bench 304 may be provided with adjustable legs 308 for leveling the bench as desired. In one application, the entire bench 304 is adjusted to have a small angle (for example, a few degrees) with floor 306. Elements 340$i$, 350$i$ and 370$i$ may be attached to bench 304 in such a manner that their positions may be adjusted, either automatically or manually in an XY plane, where the XY plane coincides with the top of bench 304. In this way, elements 340$i$, 350$i$ and 370$i$ may be adjusted so that section 302 extends along a straight line, which promotes dissipation of inherent torque.

A seismic cable angle measurement apparatus 390 may be used to determine an angular alignment of the sensors. Seismic cable angle measurement apparatus 390 (also called position device) may include one or more digital protractors 392 attached to the marine cable, i.e., section 302 and an angle recording apparatus 394, which may be a computer running recording software or a magnetic camera. In another application, element 392 is a magnet (e.g., a permanent magnet) which has a known position relative to a sensor or another element inside the streamer cable and element 394 is a magnetic camera or a proximity sensor. A proximity sensor has as output a voltage which increases as a distance between the proximity sensor and the magnet decreases. The proximity sensor has an advantage that it removes the human interface in the process by simply detecting the highest voltage output, i.e., the entire alignment process may be automatized.

Figure 4:
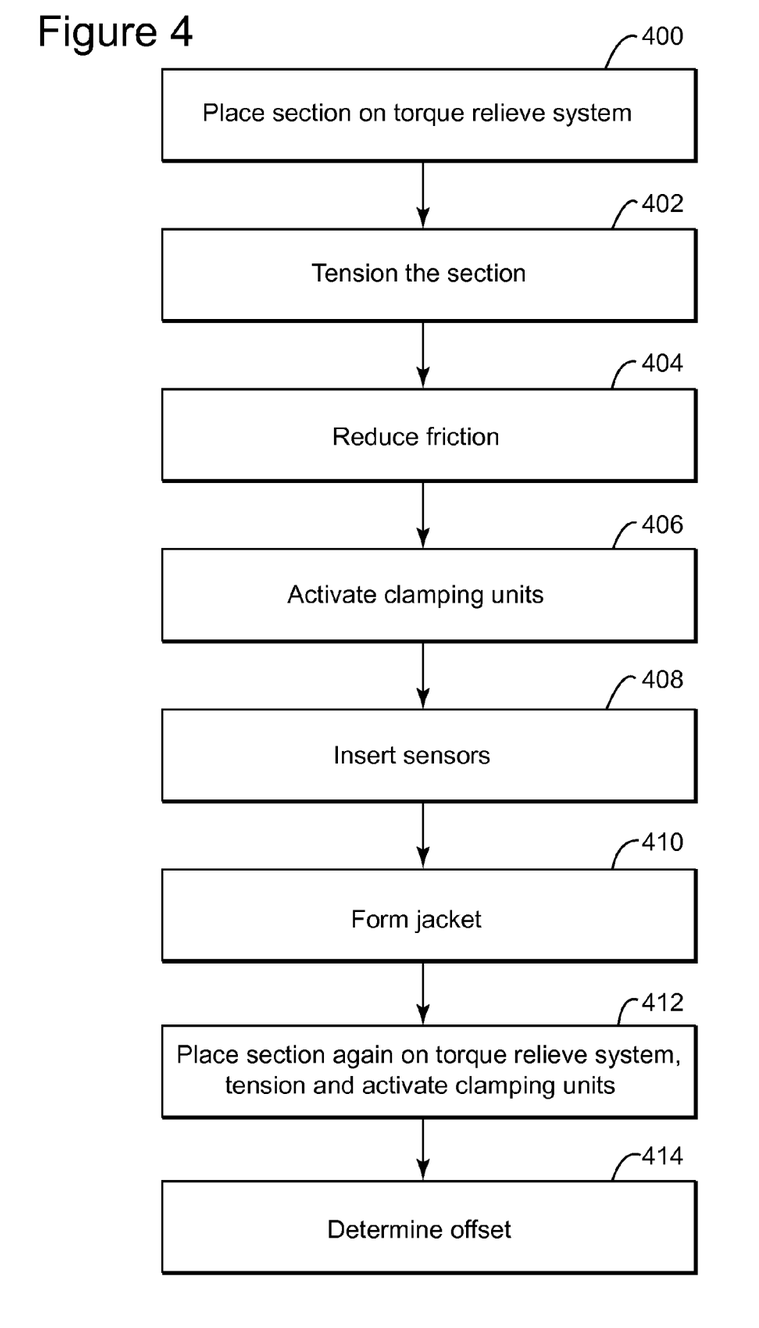
FIG. 4 is a flowchart of a method for dissipating inherent torque from a seismic cable during a manufacturing stage according to an embodiment.

With system 300 in place, the process of relieving rotational torque in section 302 and attaching sensors 382 is now discussed with regard to FIG. 4. In step 400, a section 302 is placed on the torque relief system 300. At least one end of the section is attached to a swivel bearing unit 330, and the other end of the section is attached either to deadman 314 or another swivel bearing unit. Then, after section 302 is verified to lie over bearing units 340$i$ and support elements 350$i$ and also to extend by clamping units 370$i$, a tensioning element 320, located between deadman 314 and swivel bearing unit 330, is actuated in step 402 to tense section 302.

During a next step 404, with the clamping units not activated, bearing units 340$i$ are activated to minimize friction between section 302 and system 300. Note that section 302 does not have at this time either the jacket 502 or sensors 382. Torsional torque that has accumulated in section 302 during the manufacturing process is now free to dissipate because section 302 can almost freely rotate about its longitudinal axis. After a predetermined time, which is a function of the type of materials present in section 302, torsional torque has been relieved and the clamping units are activated in step 406 to fix the angular position of section 302. In step 408 one or more sensors 382 are inserted inside section 302 at predetermined positions, e.g., relative to each clamping unit. This step may include mechanically attaching the sensor to a section's component and electrically connecting the sensor to one or more electrical cables present inside section 302. Further, this step may include aligning the particle motion sensors by attaching keyed supports to the clamped section, which then interlock with keys built into the particle motion sensor's mounting structure.

Then, section 302 is released from the clamping units and taken in step 410 for another manufacturing process during which the jacket is formed over the section's exterior. During this step, section 302 may be removed from system 300. After this, section 302 is brought back to system 300 and again tensed in step 412 to relieve any additional torsional torque, after which the section is clamped in place.

Seismic cable angle measurement apparatus 390 is used in step 414 for determining the sensors' offset. More specifically, the sensors may be equipped with a small magnet permanently embedded in the sensor carrier and aligned with the sensor's sensitive axis. Magnetic camera 394 associated with digital protractor 392 may be used to locate the sensors' rotational alignment relative to a reference, e.g., tilt meter. Alternatively, proximity sensor 394 is used to determine the angular position of the magnet, and implicitly, the sensor associated with the magnet. The rotational angle of a sensor or sensor array compared to the tilt meter reading may be recorded into the tilt meter or other component of a seismic acquisition system as offset. This offset is then used to accurately report the sensor array's angular orientation when towed through the water or the offset of each sensor. In one application, the offset of each sensor is used during a processing phase to correct the recorded data.

According to an embodiment, the system 300 discussed above has radial air bearings for friction-free cable support, spindle air bearings for friction-free tensing, and an adjustable work bench leg levelling and aligning to ensure even and consistent load on the air bearings. One advantage of the friction-free bench is being able to find the natural lay angle of a marine cable at a given tension without the influence of friction pulling hardware/swivels or traditional marine cable support/bench equipment.

Figure 5:
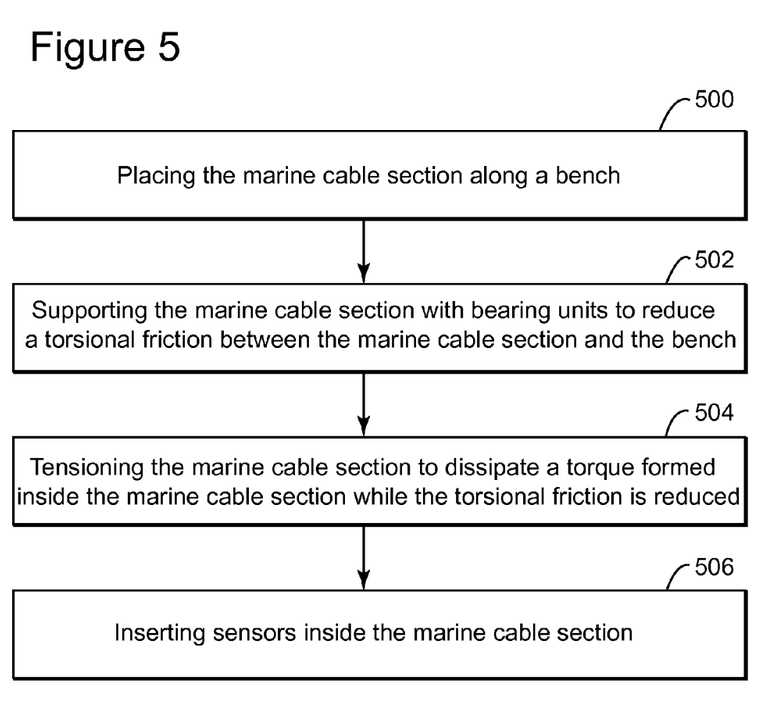
FIG. 5 is a flowchart of another method for dissipating inherent torque from a seismic cable during a manufacturing stage according to an embodiment.

According to an embodiment illustrated in FIG. 5, there is a method for dissipating a torque in a marine cable section to be used for seismic data collection. The method includes a step 500 of placing the marine cable section along a bench, a step 502 of supporting the marine cable section with bearing units to reduce torsional friction between the marine cable section and the bench, a step 504 of tensing the marine cable section to dissipate torque formed inside the marine cable section while torsional friction is reduced, and a step 506 of inserting sensors inside the marine cable section.

Figure 6:
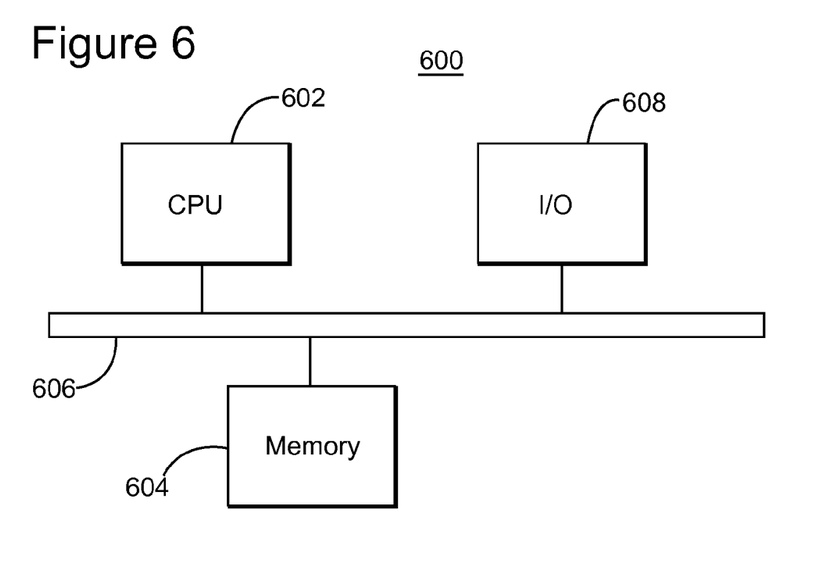
FIG. 6 is a schematic diagram of a computing device.

The above-discussed procedures and methods may be implemented in a computing device as illustrated in FIG. 6. Hardware, firmware, software or a combination thereof may be used to perform the various steps and operations described herein.

The computing device 600 of FIG. 6 is an exemplary computing structure that may be used in connection with such a system, and it may include a processor 602 and a storage device 604 that communicate via a bus 606. An input/output interface 608 also communicates with the bus 606 and allows an operator to communicate with the processor or the memory, for example, to input software instructions for operating the clamping units and/or the tensioning mechanism. The computing device 600 may be a controller, a computer, a server, etc.

The disclosed exemplary embodiments provide a system and a method for dissipating torsional torque in a section of a marine cable during manufacturing for more accurately aligning various sensors when placed inside the section. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A torque relief system for dissipating a torque in a marine cable section to be used for seismic data collection, the system comprising:
   a bench having a deadman unit and a top;
   a tensioning element connected to the deadman unit;
   a swivel bearing unit connected to the tensioning element and configured to receive a first end of the marine cable section so that the first end of the marine cable section rotates when the marine cable section is under tension and while the swivel bearing unit is in contact with the top of the bench; and
   at least one bearing unit configured to support the marine cable section with reduced friction so that when the tensioning element tenses the marine cable section, the marine cable section and the first end rotate freely until the torque is dissipated.

2. The system of claim 1, further comprising:
   plural clamping units distributed along the bench and configured to fix the marine cable section in place when the torque has dissipated.

3. The system of claim 1, wherein the marine cable section comprises:
   hydrophones and/or particle motion sensors.

4. The system of claim 1, further comprising:
   at least a support element associated with the at least one bearing unit for supporting a weight of the marine cable section when not tensed.

5. The system of claim 1, wherein the swivel bearing unit is configured to have small rotational friction and high resistance to tension.

6. The system of claim 1, further comprising:
   another swivel bearing unit connected between a second end of the marine cable section and another deadman unit of the bench.

7. The system of claim 1, further comprising:
   a seismic cable angle measurement apparatus for determining an angular alignment of sensors mounted in the marine cable section, the apparatus including one or more digital protractors and an angle recording camera.

8. The system of claim 1, further comprising:
   a position device configured to determine an offset of an angular position of a magnet attached to a sensor inside the marine cable section relative to a reference.

9. The system of claim 8, wherein the offset is stored and used during data processing.

10. The system of claim 1, wherein bearing units, support elements and clamping units are attached to the bench to support the marine cable section and they are configured to be adjustable relative to the bench for obtaining a straight line marine cable section.

11. The system of claim 1, wherein a length of the bench is longer than 100 m.

12. The system of claim 1, wherein the swivel bearing unit includes wheels, which are in contact with the top of the bench and which are configured to move the swivel bearing unit along the top of the bench, towards and away from the deadman unit.

13. The system of claim 1, wherein the at least one bearing unit is attached to the top of the bench.

14. The system of claim 1, wherein the bench further includes adjustable legs configured to provide an adjustable angle between the top of the bench and a floor.

15. A torque relief system for dissipating a torque in a marine cable section to be used for seismic data collection, the system comprising:
   a bench having a deadman unit;
   a tensioning element connected to the deadman unit;
   a swivel bearing unit connected to the tensioning element and configured to receive a first end of the marine cable section so that the first end of the marine cable section rotates when the marine cable section is under tension; and
   at least one bearing unit configured to support the marine cable section with reduced friction so that when the tensioning element tenses the marine cable section, the marine cable section and the first end rotate freely until the torque is dissipated, wherein the at least one bearing unit is an air bearing unit that releases air toward the marine cable section, wherein the released air supports the marine cable section and prevents it from contacting a top surface of the at least one bearing unit.

16. The system of claim 15, further comprising:
at least a support element associated with the at least one bearing unit for supporting a weight of the marine cable section when not tensed.

17. The system of claim 15, further comprising:
another swivel bearing unit connected between a second end of the marine cable section and another deadman unit of the bench.

18. The system of claim 15, wherein the swivel bearing unit includes wheels, which are in contact with a top of the bench and which are configured to move the swivel bearing unit along the top of the bench, towards and away from the deadman unit.

19. The system of claim 15, wherein the at least one bearing unit is attached to the top of the bench.

20. The system of claim 15, wherein the bench further includes adjustable legs configured to provide an adjustable angle between the top of the bench and a floor.

* * * * *